(12) United States Patent
Eisele et al.

(10) Patent No.: US 8,848,172 B2
(45) Date of Patent: Sep. 30, 2014

(54) DISTANCE MEASURING DEVICE HAVING HOMOGENIZING MEASUREMENT EVALUATION

(75) Inventors: Andreas Eisele, Leinfelden-Echterdingen (DE); Bernd Schmidtke, Leonberg (DE); Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/640,591

(22) PCT Filed: Feb. 16, 2011

(86) PCT No.: PCT/EP2011/052252
§ 371 (c)(1),
(2), (4) Date: Mar. 1, 2013

(87) PCT Pub. No.: WO2011/128131
PCT Pub. Date: Oct. 20, 2011

(65) Prior Publication Data
US 2013/0208258 A1    Aug. 15, 2013

(30) Foreign Application Priority Data
Apr. 12, 2010    (DE) .................. 10 2010 003 843

(51) Int. Cl.
*G01C 3/08*    (2006.01)
*G01S 7/491*    (2006.01)
*G01C 3/02*    (2006.01)
*G01S 17/36*    (2006.01)

(52) U.S. Cl.
CPC .................. *G01C 3/02* (2013.01); *G01S 7/4915* (2013.01); *G01S 17/36* (2013.01); *G01S 7/4913* (2013.01)
USPC ............ 356/5.01; 356/3.01; 356/4.01; 356/9; 356/625

(58) Field of Classification Search
USPC ............................. 356/3.01, 4.01, 5.01, 9, 625
See application file for complete search history.

(56) References Cited

U.S. PATENT DOCUMENTS

| | | | |
|---|---|---|---|
| 7,221,435 B2 * | 5/2007 | Stierle et al. ................. | 356/4.01 |
| 2007/0034778 A1 * | 2/2007 | Lustenberger et al. .... | 250/208.1 |
| 2007/0082949 A1 | 4/2007 | Ootani | |
| 2007/0182949 A1 | 8/2007 | Niclass | |

FOREIGN PATENT DOCUMENTS

| | | |
|---|---|---|
| CN | 101361008 A | 2/2009 |
| DE | 102 35 562 A1 | 2/2004 |
| EP | 1 752 793 A1 | 2/2007 |
| EP | 1 944 622 A1 | 7/2008 |
| WO | 2004/027359 A1 | 4/2004 |

OTHER PUBLICATIONS

International Search Report corresponding to PCT Application No. PCT/EP2011/052252, mailed Apr. 18, 2011 (German and English language document) (7 pages).

* cited by examiner

*Primary Examiner* — Isam Alsomiri
*Assistant Examiner* — Samantha K Abraham
(74) *Attorney, Agent, or Firm* — Maginot, Moore & Beck

(57) ABSTRACT

A handheld measuring device for optical distance measurement includes a transmitting device, a receiving device, an evaluation device, and a homogenizing device. The transmitting device is configured to transmit periodically modulated optical measurement radiation toward a target object. The receiving device is configured to detect optical measurement radiation returning from the target object. The evaluation device is configured to receive and evaluate detection signals of the receiving device. The evaluation device comprises a plurality of accumulation devices configured to accumulate detection signals. The evaluation device conducts detection signals during a sampling time window from a plurality of sampling time windows temporally schematically changeably to an assigned accumulation device from the plurality of accumulation devices, such that the accumulation device accumulates the detection signals during the sampling time window.

10 Claims, 5 Drawing Sheets

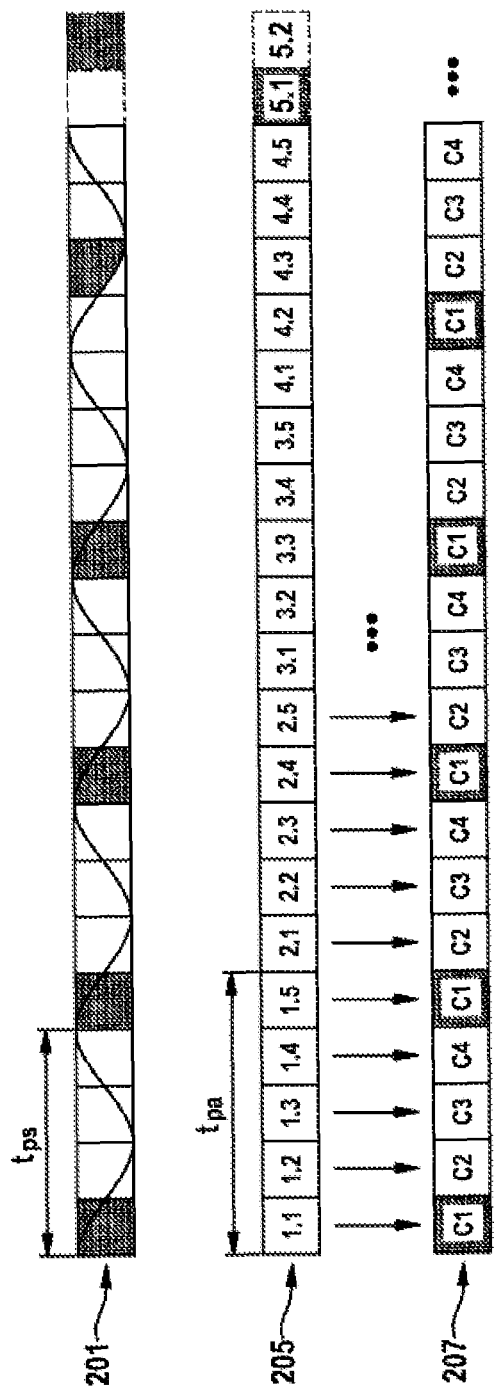

DISTANCE MEASURING DEVICE HAVING HOMOGENIZING MEASUREMENT EVALUATION

This application is a 35 U.S.C. §371 National Stage Application of PCT/EP2011/052252, filed on Feb. 16, 2011, which claims the benefit of priority to Serial No. DE 10 2010 003 843.1, filed on Apr. 12, 2010 in Germany, the disclosures of which are incorporated herein by reference in their entirety.

BACKGROUND

The disclosure relates to a distance measuring device, in particular a distance measuring device for optical distance measurement.

Optical distance measuring devices are known which align a temporally modulated light beam in the direction toward a target object whose distance from the measuring device is intended to be determined. Light returning from the target object aimed at is at least partly detected by the measuring device and used for determining the distance to be measured. In this case, a typical measurement range includes distances from a few centimeters up to several hundred meters.

US 2007/0182949 A1 discloses a distance measuring device comprising a light source for illuminating the target object using continuously modulated light, a solid-state image sensor comprising an array of avalanche photodiodes, and a plurality of circuits for processing signals that are being output by the avalanche photodiodes, in order to provide data which are dependent on the light reflected from the target object onto the photodiodes. The circuits have a multiplexer designed to accumulate detection signals output by the avalanche photodiodes during different sampling time windows in different counters acting as accumulation devices.

The avalanche photodiodes serving as photon counters in this case receive the light returning from the target object and also background radiation additionally present and generate at their output electrical pulses in each case, wherein the temporal pulse density correlates with the impinging light power.

The read-out of the pulses from the avalanche photodiodes is effected with the aid of a multiplexer arrangement. The latter can be operated synchronously with a modulation of a laser used as light source in such a way that the pulses of the avalanche photodiodes increment different digital counters in a manner dependent on the point in time of the respective detection events, that is to say for example of a photon absorbed in the avalanche photodiode. A temporal period with which the light source illuminates the target object in a modulated fashion is in this case subdivided into a plurality of subperiods. In this case, a subperiod corresponds to a sampling type window, i.e. a time period during which detection signals are accumulated. A number of digital counters corresponding to the number of subperiods are provided, wherein, during each subperiod, a digital counter correspondingly assigned one-to-one is in each case incremented in accordance with the detection pulses received during the subperiod. In this way, detection events can be accumulated over a total measurement time. While an individual period can have, for example, time durations in the range of a few nanoseconds, the total measurement time can comprise many such periods and last, for example, several milliseconds or several seconds. By accumulating the measurement events in the digital counters, it is possible to record a type of histogram of the detection events relative to the temporal occurrence of detection events within subperiods. As soon as a modulation impressed on the modulated light emitted by the light source is present in the counter readings of the digital counters with sufficient statistical accuracy, it is possible, by means of a phase evaluation, to deduce a propagation time of the light between emission and detection and hence a distance between the distance measuring device and the target object. Such a principle of laser distance measurement is generally known by the designation "time of flight ranging" for example with continuous or pulsed modulation of the intensity of the laser beam.

An evaluation device which operates in this way and which, within a distance measuring device, receives detection signals from a light-sensitive detector and evaluates them by registering the detection signals in a manner synchronized with a reference, that is to say by accumulating them in accordance with their temporal occurrence relative to the periodicity of the modulated measurement light used, is also designated as so-called "binning architecture". Such a binning architecture can be realized for example with a delay locked delay line (DLL).

It has been observed that distance measuring devices which operate for example in the manner described above on the basis of at least one light-sensitive detector, multiplexer arrangements and binning architectures cannot always yield satisfactory measurement accuracies.

SUMMARY

There may therefore be a need for a distance measuring device in which a measurement accuracy is increased, a reliability of a measurement accuracy is improved, a calibration can be dispensed with and/or a measurement duration is shortened.

Such a need can be fulfilled with a measuring device as described herein. Further configurations of the measuring device are specified in the dependent claims.

Aspects of the measuring device proposed can be regarded as being based on the following insights and concepts:

As a possible source of measurement errors or measurement inaccuracies in the above-described conventional distance measuring device, for example, it has been recognized that a measurement result can be influenced greatly by variations in the temporal widths of sampling time windows and/or variations of detection sensitivities within different sampling time windows. Different widths of the sampling time windows can, particularly if the differences in width are randomly established and unknown, act as system-dictated error sources and bring about systematic errors when determining a distance to be measured. The same holds true if the detection signals are detected with different detection sensitivities within different sampling time windows. Such systematic errors should be differentiated, in principle, from noise-dictated errors, since they cannot be reduced by longer measurement times, but rather regularly only with the aid of a more accurate calibration of the distance measuring device or by a specific type of evaluation of detection signals.

Therefore, a distance measuring device is proposed which additionally comprises a homogenizing device, with the aid of which the digital or analog detection signals provided by a receiving device can be evaluated in a specific homogenized manner, i.e. are distributed over a plurality of accumulation devices that can be connected to the receiving device in such a way that variations in the widths of the sampling time windows and/or detection sensitivities within different sampling time windows have no or a smaller influence on the overall measurement result.

In this case, the proposed measuring device for optical distance measurement comprises a transmitting device for transmitting periodically modulated optical measurement radiation toward a target object, a receiving device for detecting optical measurement radiation returning from the target object, and an evaluation device for receiving and evaluating detection signals of the receiving device. In this case, the evaluation device comprises a plurality of accumulation devices for accumulating detection signals, wherein the evaluation device conducts detection signals during a sampling time window from a plurality of sampling time windows temporally schematically changeably, that is to say for example cyclically, in a temporally permuting manner or in a manner distributed temporally in accordance with an arbitrary predefined scheme, to an assigned counter from the plurality of counters. In this case, the assigned accumulation device accumulates the detection signals during the sampling time window. A total signal acquired over a total measurement duration is determined by the evaluation device from the detection signals accumulated in the accumulation devices.

The measuring device proposed additionally comprises an homogenizing device, which is designed to vary the temporally changeable assignment of accumulation devices from the plurality of accumulation devices to sampling time windows during the total measurement duration.

A fundamental concept in this case is to no longer evaluate the detection signals provided by the receiving device on account of the impinging measurement radiation reflected back in such a way that it is fed in a manner rigidly synchronized with the periodicity of the light emitted by the transmitting device in each case to counters, the temporal position of which within the periodicity is fixedly predefined and not varied during the entire measurement process. Instead, the rigid synchronization is intended to be replaced by a variable synchronization in which, during an entire measurement process, detection signals which are recorded during a specific phase within the period of the emitted modulated light are not always accumulated by the same accumulation devices within the same sampling time windows, rather the assignment of sampling time windows and accumulation devices can be varied during the total measurement duration.

To put it another way, in conventional distance measuring devices which detect an impinging modulated light signal for example by means of a photon counter supplying a digital detection signal, a temporally rigid assignment always prevailed between the phase within which the periodically modulated light was received and the sampling time window within which the respective detection signals were fed to a predetermined accumulation device. However, e.g. on account of the complex technology used for triggering the sampling time windows, for example as a result of process, voltage and temperature fluctuations, the sampling time windows do not necessarily all have an identical temporal width, as should be striven for. Moreover, the detection sensitivity can be different within different sampling time windows. Therefore, the situation could arise that, for the case where only temporally constant background light and no modulated measurement radiation impinged on the receiving device, varying accumulated detection signals were nevertheless registered in the accumulation devices. Even if it is assumed that the detection sensitivity is identical in all sampling time windows, although the photons impinging temporally at a constant rate can bring about a constant detection signal density, the detection signals can be accumulated in the respective accumulation devices over time durations which correspond to the sampling time windows of different sizes. Alternatively, for the case where the detection sensitivity is different in different sampling time windows, the detection signal density can vary despite photons impinging temporally at a constant rate, such that in the sampling time windows different quantities of detection signals are accumulated in the assigned accumulation devices. Both can have the effect that a variation of the detection signals accumulated in the accumulation devices is identified by the evaluation device despite constant light incidence. This variation can be greater than a measurement signal brought about by a modulated optical measurement radiation.

It is now proposed to vary the temporally schematically changeable assignment of the accumulation devices to the individual sampling time windows during the total measurement duration. In other words, by way of example, detection signals which are detected within a first phase of the periodically modulated measurement radiation can no longer always be accumulated during one and the same first sampling window always in the same accumulation device. Instead, a total measurement duration can be subdivided into a plurality of partial measurement durations and within a partial measurement duration there can be a fixed phase relationship between the periodically modulated measurement radiation and a cyclic assignment of the accumulation devices to sampling windows.

In other words, the evaluation method within a partial measurement duration is similar to the above-described conventional evaluation of the detection signals. Between the individual partial measurement durations, however, there can be differences in this regard to the effect that there can be a phase shift between the phase relationship between the periodically modulated measurement radiation and the cyclic assignment of the accumulation devices to sampling windows. In other words, the phase relationship between the periodically modulated measurement radiation and the cyclic assignment of the accumulation devices to sampling windows within a first partial measurement duration differs from that phase relationship within a second partial measurement duration, etc. A relative phase shift between the individual partial measurement durations can in this case be $2\pi/n$, for example, wherein n represents the number of partial measurement durations.

In this case, the number of sampling time windows can be equal to the number of accumulation devices and can furthermore correspond to the number of partial measurement durations. By way of example, eight sampling time windows and eight accumulation devices can be provided, which are assigned to one another differently in each case within eight partial measurement durations. By way of example, during a first partial measurement duration measurement signals from a first phase of the modulated measurement light can be forwarded to a first accumulation device within a first sampling time window, whereas in a second partial measurement duration the detection signals from the first phase of the modulated measurement light are forwarded to the first accumulation device during a second sampling time window, etc.

Preferably, the temporally changeable assignment of a respective one of the counters to a respective one of the sampling time windows is varied by the homogenizing device in such a way that over the total measurement duration at least a plurality of the accumulation devices, preferably each of the accumulation devices, is assigned approximately equally often to each of the sampling time windows. What can preferably be achieved as a result is that detection signals which are detected within a specific phase of the periodically modulated measurement light are accumulated homogeneously over all available sampling time windows by the accumulation devices. What can preferably thereby be achieved is that a deviation of the temporal width of sampling time windows or a deviation of a detection sensitivity from an average value no longer leads only to an accumulation of detection signals in a single accumulation device, rather instead this sampling time window is used successively by all or at least a plurality of the available accumulation devices in order to accumulate detection signals in the time duration of said window.

In this way it is possible to achieve homogenization with regard to the temporal width of the sampling time windows. Analogously, it is also possible to achieve homogenization with regard to different sensitivities within the sampling time windows.

Particularly for the case where the number of sampling time windows and the number of accumulation devices are not identical, a period duration of a cyclically repeating sequence of the number of sampling time windows can differ from the period duration of the modulated measurement radiation. What can be achieved in this way, too, is that a specific sampling time windows does not always forward is the same phase of the modulated measurement radiation to the same accumulation device, rather this assignment is temporally variable on account of the different period durations of the sum of the sampling time windows, on the one hand, and the modulated measurement radiation, on the other hand. The desired homogenization can thus once again occur during the sampling of the detection signals.

Possible aspects, advantages and configurations of the disclosure have been described above with reference to individual embodiments of the disclosure. The description, the associated figures and the claims contain numerous features in combination. A person skilled in the art will also consider these features, in particular also the features of different exemplary embodiments, individually and combine them to form expedient further combinations.

BRIEF DESCRIPTION OF THE DRAWINGS

Embodiments of the disclosure and partial aspects contained therein are described below with reference to the accompanying figures. The figures are merely schematic and not true to scale.

FIG. 6 illustrates an alternative method for the temporally changeable assignment of counters to sampling time windows such as can be used in a measuring device in accordance with one embodiment of the present disclosure.

DETAILED DESCRIPTION

Figure 1:
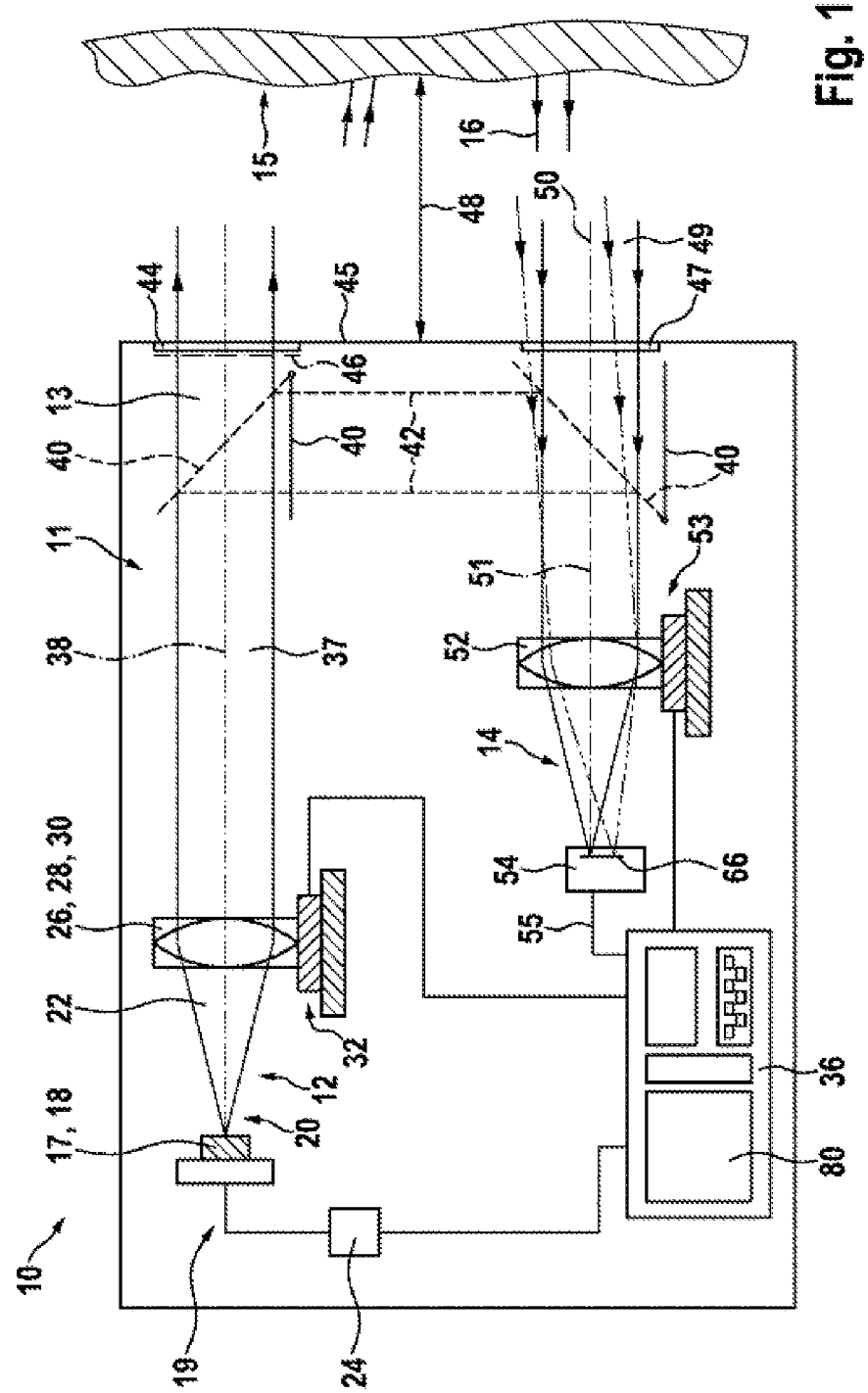
FIG. 1 shows a measuring device for optical distance measurement in accordance with one embodiment of the present disclosure.

FIG. 1 schematically illustrates a measuring device 10 according to the disclosure in the form of an optical distance measuring device with the most important components for describing its function. However, the disclosure itself is not restricted to the field of optical distance measurement.

The measuring device 10 comprises a housing 11, in which a transmitting device 12 for emitting optical measurement radiation 13 and a receiving device 14 for detecting measurement radiation 16 returning from a target object 15 are arranged.

The transmitting device 12 comprises a light source, which is realized by a semiconductor laser diode 18 in the exemplary embodiment illustrated. The laser diode 18 emits a laser beam 20 in the form of a light bundle visible to the human eye. For this purpose, the laser diode 18 is operated by means of a control unit 24, which, by means of corresponding electronics, generates a temporal modulation of an electrical input signal 19 of the laser diode 18. What can be achieved by such modulation of the diode current is that the optical measurement radiation 13 utilized for distance measurement is likewise modulated temporally in terms of its intensity in a desired manner.

In particular during a distance measuring process, the laser beam bundle 20 subsequently passes through a collimation optical unit 26 in the form of an objective 28, which is illustrated in the form of an individual lens in a simplified manner in FIG. 1. After passing through the objective 28, this results in a, for example amplitude-modulated, signal of the measurement radiation 13 in the form of an almost parallel light bundle 37, which propagates along an optical axis 38 of the transmitting unit 12.

If a distance measurement is carried out by means of the measuring device 10, the measurement radiation 13 leaves the housing 11 of the measuring device through an optical window 44 in the end wall 45 of the measuring device 10. The opening of the optical window 44 can be protected for example by a shutter 46. For the purpose of actual measurement, the measuring device is then aligned toward a target object 15 whose distance 48 from the measuring device 10 is intended to be determined. The radiation reflected or scattered at the desired target object 15 forms returning optical measurement radiation 16 in the form of a returning beam bundle 49 or 50, a certain portion of which passes back into the measuring device 10 again. Two returning measurement beam bundles 49 and 50 for two different target object distances 48 are depicted for illustration by way of example in FIG. 1. Through an entrance window 47 at the end side 45 of the measuring device 10, the returning measurement radiation 16 is coupled into the measuring device 10 and then impinges, as illustrated in FIG. 1, on a receiving optical unit 52.

The receiving optical unit 52, which is likewise merely symbolized schematically by an individual lens in FIG. 1, focuses the beam bundle of the returning measurement radiation 16 onto the detection area 66 of a receiving detector 54 provided in the receiving device 14. The detector 54 has one pixel or a multiplicity of pixels for detecting the optical measurement radiation. Each of the pixels has at least one light-sensitive SPAD (Single Photon Avalanche Diode) acting as a digital photon detector. By means of the SPADs provided in the detection area 66, the incident returning measurement radiation 16 is converted into an electrical signal 55 and fed for further evaluation in the evaluation device 36. In this case, on account of inherent properties of the SPADs, the electrical signal 55 can be regarded as a digital detection signal that reproduces a counting rate of photons impinging on the respective pixels of the detection area 66.

The evaluation device 36 can suitably sum the detection signals generated by a SPAD and generate therefrom a total signal corresponding to a time-dependent intensity of the light signal impinging on the SPAD or the light intensity. By relating this total signal to an excitation signal indicating the temporal profile of the photon rate emitted by the transmitting device 12, it is possible to deduce a photon time of flight from the transmitting device 12 toward the target object 15 and back again to the receiving device 13. If the transmitting device 12 periodically modulates the emitted light sinusoidally, for example, it is possible to determine a time of flight from a phase difference between the emitted and detected measurement radiation.

In detail, the evaluation device 36 can forward the digital detection signals received by the receiving device 14 to different digital counters during different sampling time windows. The counters in this case act as accumulation devices. The evaluation device is in some instances also designated herein as "binning architecture" and the sampling time windows are in some instances designated as "bin widths". In this case, the sum of the sampling time windows can correspond to the period of the modulated measurement radiation. In other words, during a sampling time window, a periodically repeating phase region of the periodically modulated detection signal is detected and the corresponding digital detection signals are accumulated in counters. For this purpose, the detection signals, temporally correlated with the periodicity of the driving signal to the laser diode 18, can be conducted to correspondingly assigned digital counters via multiplexers during the different sampling time windows. The operation of the varying assignment of counters and sampling time windows is controlled within the evaluation device by a homogenizing device 80. From the counting results of the digital counters accumulated over many periods, it is then possible to deduce the phase difference between the emitted and detected measurement radiation and thus to determine the desired distance.

Figure 2:
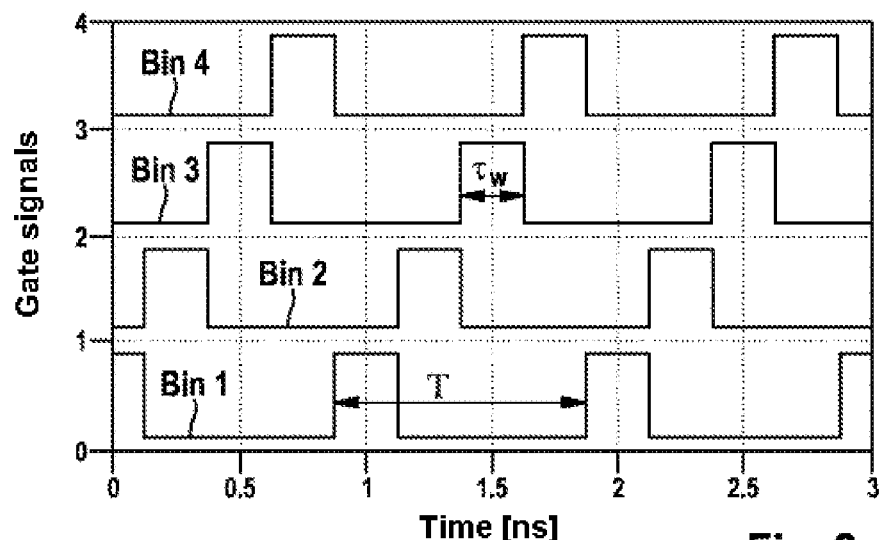
FIG. 2 shows a schematic illustration of digital gate signals of a binning architecture such as can be used in a measuring device according to the disclosure.

FIG. 2 shows a schematic illustration of digital gate signals of a binning architecture on the basis of the example of four sampling windows. The size and the stability of the bin widths actually realized can constitute a particularly large systematic error source. A deviation of the bin widths from their desired value can have a considerable effect on the measurement result, particularly in the case of strong background illumination. A variation of the detection sensitivities of different bins can also similarly have a great effect on the measurement result.

The control signals controlling the bin widths or sampling time windows in this case need not have the rectangular temporal profile illustrated in FIG. 2. Other time profiles such as, for example, sinusoidal time profiles of the control signals are also possible.

Figure 3:
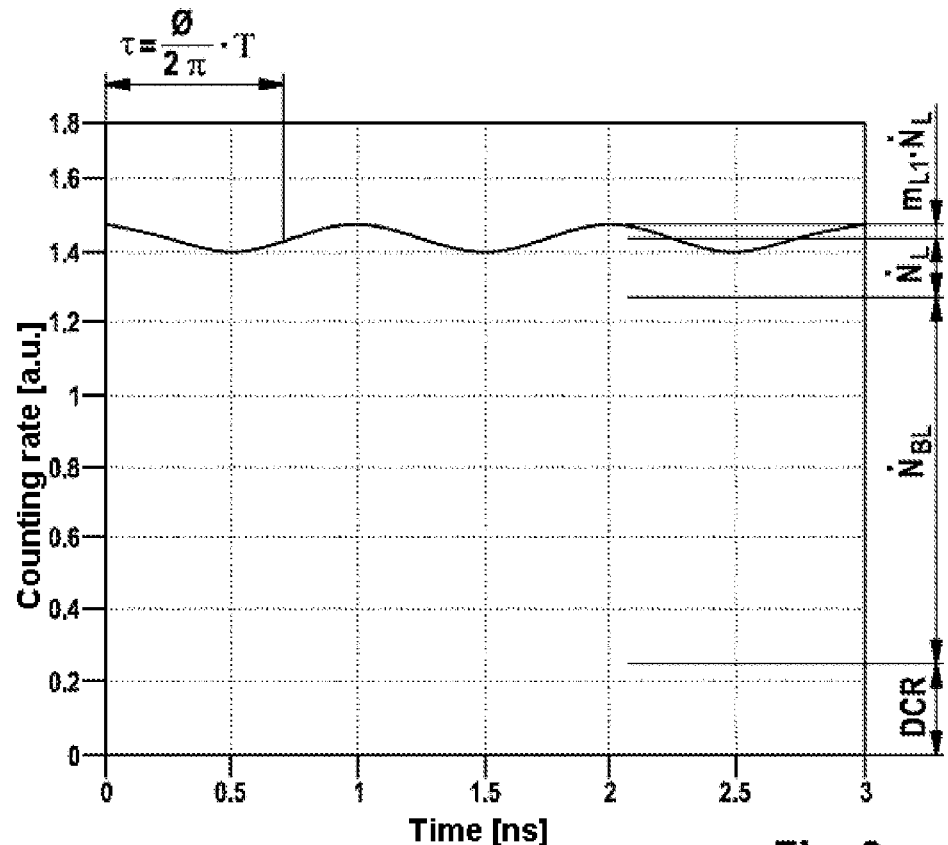
FIG. 3 shows by way of example a temporal dependence of a counting rate of a photon counter used as a receiving device in the case of illumination with modulated measurement radiation.

One possible advantage of the disclosure in accordance with one embodiment is described below on the basis of an example with continuously modulated laser radiation, specifically with sinusoidal modulation. With the designations given in FIG. 3, the modulation M on the receiving side is defined by $$M \equiv \frac{m_{L1} \cdot \dot{N}_L}{\dot{N}_L + \dot{N}_{BL} + DCR} \quad (1)$$

In this case, $m_{L1}$ is a factor describing the modulation depth of the laser radiation emitted on the device side, $\dot{N}_L$ is the temporally averaged counting rate (in counts/s) with respect to the detected laser light, $\dot{N}_{BL}$ is the temporally averaged counting rate with respect to background radiation, and DCR is a dark counting rate of the detector. Under typical measurement conditions, the modulation can assume values in the percent range, for example.

Furthermore, an estimation of the error propagation of the bin width error $\delta\tau_w$ to the phase error $\Delta\phi$ yields the following relationship:

$$\Delta\phi \propto \frac{1}{M} \cdot \frac{\delta\tau_w}{T} \quad (2)$$

where T represents the period of the modulated measurement radiation.

The phase error is antiproportional to the modulation of the signal received under measurement conditions and proportional to the relative accuracy of the bin width relative to the modulation period. The high sensitivity of the system to deviations of the bin widths from the desired value thus become clear: given strong background illumination, a uniform phase accuracy requires a higher accuracy during the bin width calibration or a suitable evaluation method based, for example, on the homogenization of sampling time windows as described herein.

Figure 4:
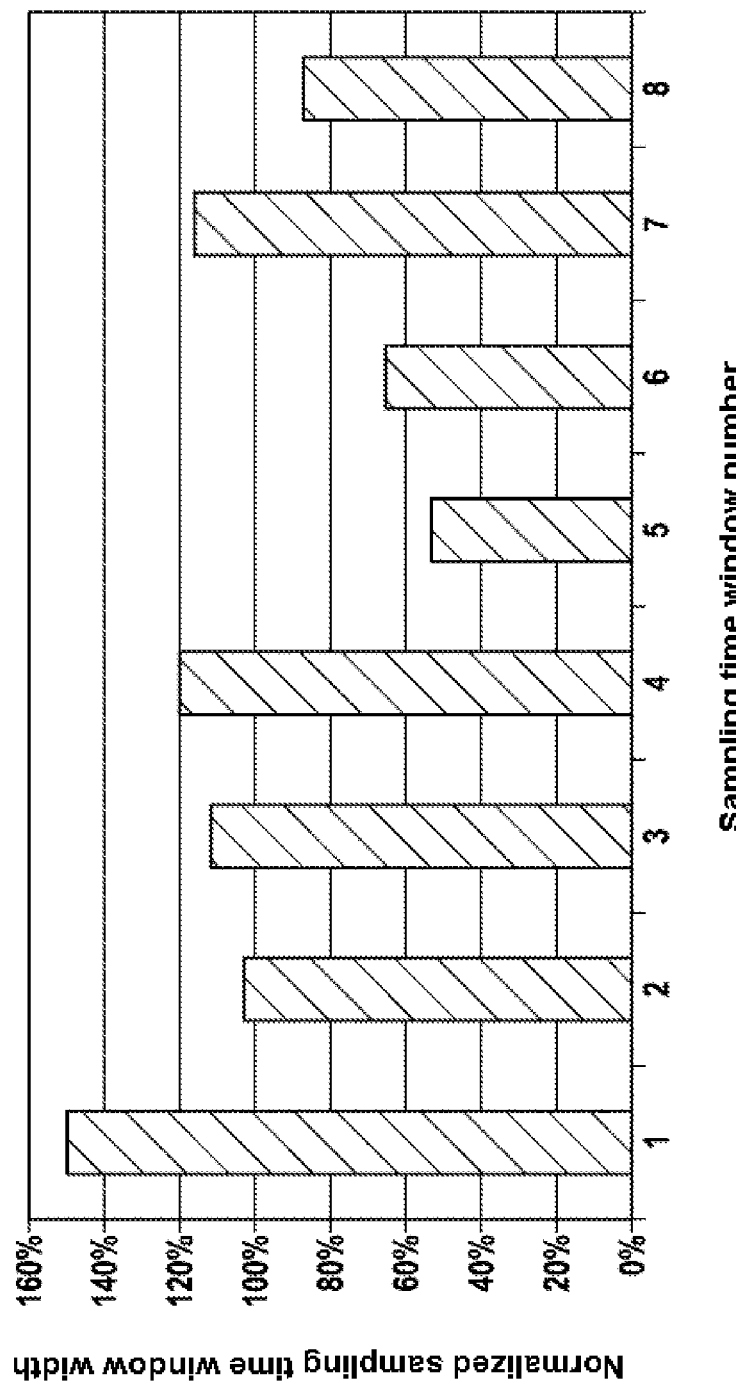
FIG. 4 shows by way of example variations of a normalized width of sampling time windows.

FIG. 4 shows, on the basis of the example of a binning scheme with eight sampling time windows, how the temporal width of the individual sampling time windows can vary. The plurality of sampling time windows 1 to 8 can progressively sample a period of the modulated measurement beam, wherein within each sampling time window the acquired detection signals are conducted into a counter assigned to this point in time and are accumulated in said counter. In this case, the temporal width of a sampling window can be a fraction, for example an n-th (where n=number of sampling time windows). For the case where the measurement radiation is modulated with frequencies in the range of 1 GHz, for example, the result here is that the temporal width of a sampling time window can be significantly shorter than 1 ns, for example in the range of 100 ps. Since, as explained above, the modulated measurement radiation ultimately to be detected can make up merely approximately 1% of the total radiation impinging on the receiving device, a variation of the width of the sampling time windows of less than 1 ps can already significantly influence the measurement result.

Figure 5:
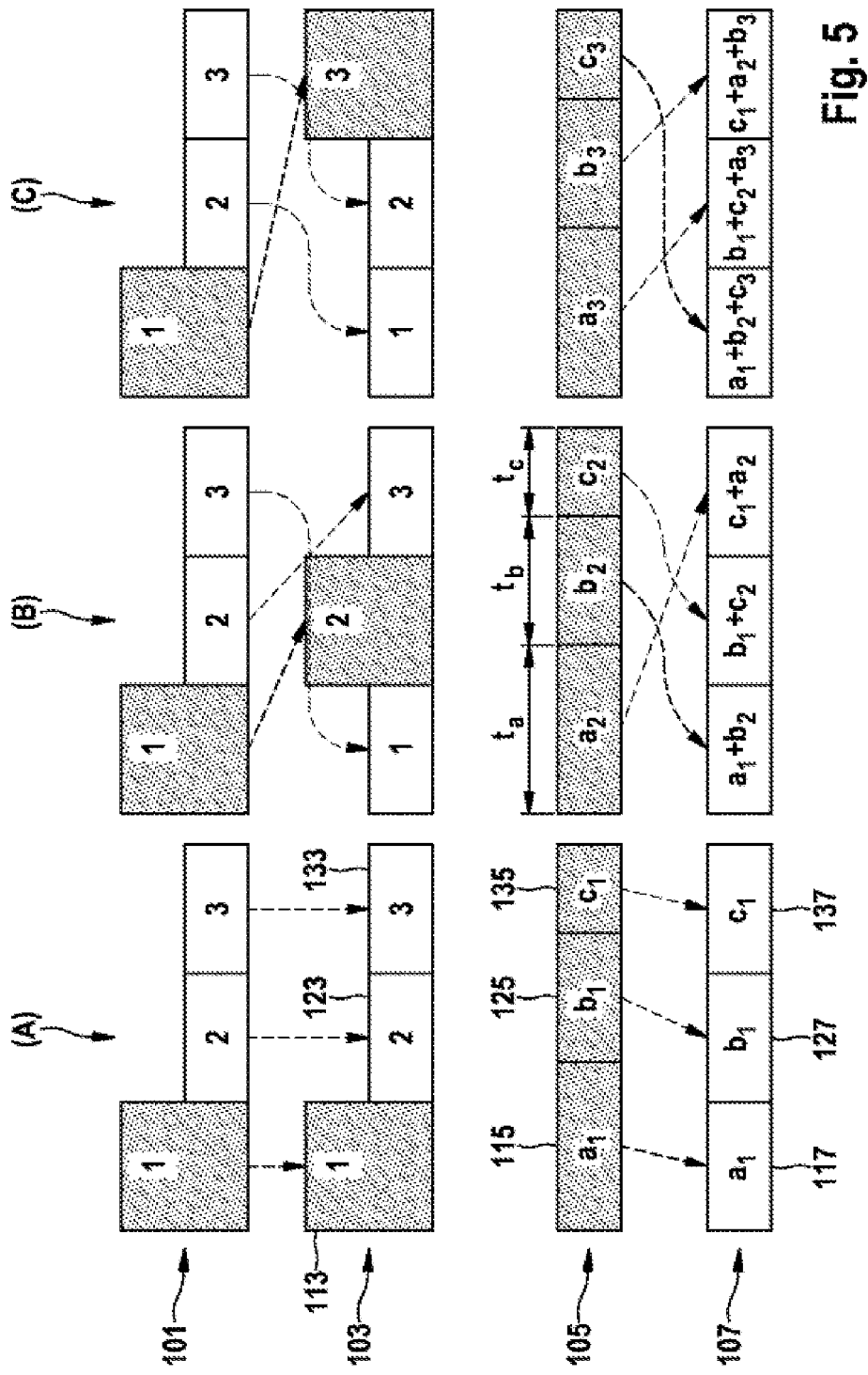
FIG. 5 illustrates a method for the temporally changeable assignment of counters to sampling time windows such as can be used in a measuring device in accordance with one embodiment of the present disclosure.

Referring to FIGS. 5 and 6, embodiments of the disclosure will now be described in which, with the aid of a suitable method of varying assignment of digital counters and sampling time windows, it is possible to achieve a largely homogeneous distribution of the background light detection signal over all sampling time windows used, wherein the modulated measurement beam detection signal to be measured can furthermore be determined.

For n sampling time windows, the proposed homogenizing method, in a first configuration, can consist of, for example, n=3 partial measurements (A), (B) and (C), as is illustrated in FIG. 5. Each partial measurement can consist of a multiple periodic repetition. The partial measurements can have identical or differing partial measurement durations and preferably take place on a time scale on which the background illumination does not change significantly.

In a first partial measurement (A), a transmitted signal 103 of a periodically modulated optical measurement radiation having an unshifted phase angle is generated. The unshifted signal is respectively illustrated in row 101 in FIG. 5. After reflection at the target object, the transmitted signal 103 is then detected as a detection signal within the time intervals defined by the sampling time windows 115, 125, 135, wherein the sampling time windows 115, 125, 135 form a sequence 105 of sampling time windows and have different temporal widths $t_a$, $t_b$, $t_c$. Consequently, each individual sampling window is assigned a detected number of individual detection signals, which are designated by $a_1, a_2, a_3, b_1, b_2 \ldots c_3$ in FIG. 5. The individual detection signals are accumulated during the sampling time window in temporarily assigned counters 117, 127, 137 of a plurality of counters 107. There is a one-to-one variable assignment between the counters 107 and the sampling time windows 105.

In a second partial measurement (B), the transmitted signal 103 having a phase shift of $2\pi/n$ is generated. After reflection at the target object, the transmitted signal is in turn detected by the receiving device, wherein the detection signals are in turn accumulated within the sampling windows 105 in the counters assigned to this point in time. In this case, the assignment between sampling windows 115, 125, 135 and counters 117, 127, 137 is shifted cyclically by −1 in the second partial measurement, as indicated by arrows in FIG. 5. Consequently, by way of example, the detection signals $b_2$ detected within the second sampling time window 125 are accumulated in the first counter 117, such that said counter has the content $a_1+b_2$ at the end of the second partial measurement (B).

In a third partial measurement (C), a transmitted signal 103 having a phase shift of $2\times 2\pi/n$ is generated. Accordingly, the detection signals detected within the sampling time windows 105 are accumulated in the counters assigned to this point in time, wherein the assignment between sampling windows 115, 125, 135 and counters 117, 127, 137 is shifted cyclically by −2 in the third partial measurement. Consequently, by way of example, the detection signals $c_3$ detected within the third sampling time window 135 are accumulated in the first counter 117, such that said counter has the content $a_1+b_2+c_3$ at the end of the third partial measurement (C).

Each of the counters 117, 127, 137 has now received and summed exactly once the detection signals detected within each sampling time window. The absolute value of the uniformly distributed background light summed in each counter is thus distributed homogeneously independently of the temporal width of the sampling time window. At the same time, the transmitted signal 103 is mapped almost with phase fidelity. That is to say that, in the example illustrated, the transmitted signal 103 and the assignment of the sampling time windows is phase-shifted between the individual partial measurements in such a way that that sampling time window during which the phase-shifted transmitted signal 103 is detected is always linked to the first counter 117.

To summarize, in the exemplary embodiment illustrated, a transmitted signal 103, during different partial measurements (A), (B), (C), is emitted in the direction of a target object, reflected there and detected by a receiving device, which can be configured, for example, as a photon counter in the form of a SPAD (Single Photon Avalanche Diode). The transmitted signal 103 is progressively phase-shifted relative to an unshifted signal 101 during the individual partial measurements (A), (B), (C). During sampling time windows 115, 125, 135, the detection signals are forwarded to assigned counters 117, 127, 137. An assignment of the counters 117, 127, 137 to the sampling windows 115, 125, 135 can vary between the individual partial measurements (A), (B), (C). What can be achieved in this way is that background light is distributed homogeneously over all counters 117, 127, 137, whereas the transmitted signal 103 is accumulated only in specific counters 117. Measurement errors on account of non-identical temporal widths of the sampling time windows or on account of different measurement sensitivities within different sampling time windows can thereby be minimized.

Analogously to the homogenization of the different temporal widths of the sampling time windows, homogenization with regard to different detection sensitivities can also be effected.

The relative phase shift between the individual partial measurements can be in an idealized manner, but not necessarily, exactly $2\pi/n$. A deviation therefrom can occur, for example, if transmitted signal and sampling time window are derived by the same non-ideal binning scheme. The phase shift can, but need not, be realized cyclically. Permutations or random schemes are conceivable.

One advantageous effect of the homogenization proposed herein can be achieved particularly when an assignment between sampling time windows and counters is linked to a phase shift of the transmitted signal in such a way that the detection signals of all the sampling windows are accumulated after a finite total measurement duration in a manner distributed approximately uniformly in all of the available counters.

Symmetry considerations with regard to the width of the sampling time windows can relax the requirement that each sampling time window increments each counter. By way of example, if the sampling time windows of the first and second halves of a modulation period are identical, then the number of interchanges or phase shifts can be halved. In the case of an even number of sampling time windows, for example, the measurement can be reduced to two partial measurements phase-shifted by $\pi$. This can have the effect that the counter readings are identical as a result of background light in the first and second halves of a modulation period.

In the further exemplary embodiment illustrated in FIG. 6, the transmitted signal 201 is constant in terms of phase. Instead, the sampling time windows 205 are shifted in terms of phase relative to the transmitted signal 201. In this case, the number n of counters 207 (in the example illustrated n=4) or of subperiods of the transmitted signal 201 (in the example illustrated n=4) differs from the number m of sampling time windows 205 (in the example illustrated m=5). To put it another way, the period duration tps of the modulated measurement radiation 201 is different than the period duration tpa of the cyclically repeating sequence 205 of sampling time windows. By virtue of the fact that the number m of sampling time windows 205 differs from a number n of counters 207, what can be achieved is that each of the sampling time windows in the course of a total measurement extending over many repetitions of the sequence of sampling time windows supplies detection signals to each of the counters. The total detection signal corresponding to the background light is thus distributed homogeneously over all counters, whereas the detection signal corresponding to the modulated measurement light is in each case conducted into the same counter and accumulated there.

While the embodiments described above were in each case based on a receiving device with a single digital photon counter, for example in the form of a SPAD, the receiving device can alternatively also have a plurality of light detectors. The light detectors can operate digitally or in analog fashion. By way of example, it is possible to use a pixel array of a plurality of digitally operating SPADs or a CCD chip operating in an analog fashion with a plurality of pixels. A 2D or 3D camera can thereby be realized. Detection signals from a respective one of the pixels can be accumulated during an assigned sampling time window in an accumulation device. For the case where the individual pixels have different detection sensitivities, a negative influence of these different detection sensitivities on the total measurement result can be considerably reduced with the aid of the homogenization described.

One advantage that can be achieved by the homogenization of sampling time windows or detection sensitivities as described herein can reside in the shortening of the total measurement duration, since a calibration of the sampling time windows or of the binning architecture can be dispensed with. Alternatively, with additional calibration it is possible to achieve an increased measurement accuracy. This can be advantageous particularly in measuring devices in which a high measurement accuracy is required and measurement radiation having high modulation frequencies is therefore used, since the calibration necessary at such high modulation frequencies, for example in the range of 1 GHz or more, can, particularly when there is a low signal-to-noise ratio, last for a very long time, for example longer than the actual distance measurement.

A further advantage can consist in a lower power consumption since, if appropriate, there may be no need for a separate measurement for calibration purposes.

A further advantage can be the low circuitry outlay required for realizing the homogenizing device. By way of example, the sampling time windows and the modulation of the measurement radiation can be derived from a common source.

Furthermore, a background light calibration can also be dispensed with under variable conditions such as, for example, a temperature drift.

The invention claimed is:

1. A handheld measuring device for optical distance measurement, comprising:
    a transmitting device configured to transmit periodically modulated optical measurement radiation toward a target object;
    a receiving device configured to detect optical measurement radiation returning from the target object; and
    an evaluation device configured to receive and evaluate detection signals of the receiving device; and
    a homogenizing device,
    wherein the evaluation device comprises a plurality of accumulation devices configured to accumulate detection signals,
    wherein the evaluation device conducts detection signals during a sampling time window from a plurality of sampling time windows temporally schematically changeably to an assigned accumulation device from the plurality of accumulation devices, such that the accumulation device accumulates the detection signals during the sampling time window,
    wherein the evaluation device determines a total signal acquired over a total measurement duration from the detection signals accumulated in the accumulation devices, and
    wherein said homogenizing device is configured to vary the temporally schematically changeable assignment of accumulation devices from the plurality of accumulation devices to sampling time windows during the total measurement duration.

2. The measuring device as claimed in claim 1, wherein the homogenizing device varies the schematically changeable assignment in such a way that over the total measurement duration a plurality of the accumulation devices are assigned approximately equally often to each of the sampling time windows.

3. The measuring device as claimed in claim 1, wherein:
    the total measurement duration is subdivided into a plurality of partial measurement durations,
    within a partial measurement duration, there is a fixed phase relationship between the periodically modulated measurement radiation and a cyclic assignment of the accumulation devices to sampling time windows, and
    between different partial measurement durations, there is a relative phase shift in said phase relationship.

4. The measuring device as claimed in claim 3, wherein:
    between partial measurement durations, there is a relative phase shift of $2\pi/n$, and
    n is the number of partial measurement durations.

5. The measuring device as claimed in claim 1, wherein the temporally schematically changeable assignment of accumulation devices to sampling time windows is synchronized with the modulated measurement radiation.

6. The measuring device as claimed in claim 1, wherein the number of sampling time windows and the number of accumulation devices are identical.

7. The measuring device as claimed in claim 1, wherein the number of sampling time windows and the number of accumulation devices are not identical.

8. The measuring device as claimed in claim 1, wherein a period duration of a cyclically repeating sequence of the number of sampling time windows differs from the period duration of the modulated measurement radiation.

9. The measuring device as claimed in claim 1, wherein the receiving device comprises at least one SPAD.

10. The measuring device as claimed in claim 1, wherein the detection signals are conducted from the receiving device to the accumulation devices through multiplexers.

* * * * *